(12) United States Patent
Artsyukhovich

(10) Patent No.: US 8,760,637 B2
(45) Date of Patent: Jun. 24, 2014

(54) OPTICAL SENSING SYSTEM INCLUDING ELECTRONICALLY SWITCHED OPTICAL MAGNIFICATION

(75) Inventor: Alexander N. Artsyukhovich, San Juan Capistrano, CA (US)

(73) Assignee: Alcon Research, Ltd., Fort Worth, TX (US)

( * ) Notice: Subject to any disclaimer, the term of this patent is extended or adjusted under 35 U.S.C. 154(b) by 187 days.

(21) Appl. No.: 13/216,507

(22) Filed: Aug. 24, 2011

(65) Prior Publication Data
US 2012/0050741 A1    Mar. 1, 2012

Related U.S. Application Data

(60) Provisional application No. 61/378,081, filed on Aug. 30, 2010.

(51) Int. Cl.
*G01N 21/00* (2006.01)
*G01N 21/25* (2006.01)

(52) U.S. Cl.
USPC .............................................. 356/73; 356/419

(58) Field of Classification Search
CPC ................................ G10L 9/007; G02B 15/00
USPC ........................................ 356/416–419, 72–73
See application file for complete search history.

(56) References Cited

U.S. PATENT DOCUMENTS

| | | |
|---|---|---|
| 1,718,494 A | 6/1929 | Schurig |
| 2,260,837 A | 10/1941 | Kuehni |
| 2,510,073 A | 6/1950 | Clark |
| 2,583,941 A | 1/1952 | Gordon |
| 3,324,855 A | 6/1967 | Heimlich |
| 3,628,373 A | 12/1971 | Gilbert |
| 3,805,617 A | 4/1974 | Kamazuka |
| 3,809,891 A | 5/1974 | Erdman et al. |

(Continued)

FOREIGN PATENT DOCUMENTS

| | | |
|---|---|---|
| DE | 1297347 | 6/1969 |
| DE | 3030259 | 2/1982 |

(Continued)

OTHER PUBLICATIONS

ESR for EP 06122959.7, Publicaiton No. EP1779878, 2 pages—Dec. 19, 2006.*

(Continued)

*Primary Examiner* — Gregory J Toatley
*Assistant Examiner* — Shawn Decenzo
(74) *Attorney, Agent, or Firm* — Kenneth D. Bassinger

(57) ABSTRACT

Disclosed is an exemplary optical sensing system including at least one light source for emitting light in a first wavelength range and light in a second wavelength. An image sensor is provided for detecting light emitted from the at least one light source. The optical sensing system also includes a first optical filter disposed in a first optical path extending between the light source and the image sensor, the first optical filter configured to pass light emitted in the first wavelength range, and to substantially block light emitted in the second wavelength range. A second optical filter is disposed in a second optical path extending between the light source and the image sensor, the second optical filter configured to pass light emitted from the at least one light source in the second wavelength range, and to substantially block light emitted in the first wavelength range.

12 Claims, 6 Drawing Sheets

(56) References Cited

U.S. PATENT DOCUMENTS

| | | | |
|---|---|---|---|
| 3,842,353 | A | 10/1974 | Stewart |
| 3,976,380 | A | 8/1976 | Rottenkolber et al. |
| 4,009,966 | A | 3/1977 | Craig |
| 4,123,227 | A | 10/1978 | Heim et al. |
| 4,140,118 | A | 2/1979 | Jassawalla |
| 4,158,310 | A | 6/1979 | Ho |
| 4,160,600 | A * | 7/1979 | Luke .................. 356/506 |
| 4,187,057 | A | 2/1980 | Xanthopoulos |
| 4,196,961 | A | 4/1980 | Walter et al. |
| 4,255,966 | A | 3/1981 | Batie et al. |
| 4,274,740 | A | 6/1981 | Eidenschink et al. |
| 4,281,339 | A | 7/1981 | Morishita et al. |
| 4,281,666 | A | 8/1981 | Cosman |
| 4,281,667 | A | 8/1981 | Cosman |
| 4,286,880 | A | 9/1981 | Young |
| 4,297,588 | A | 10/1981 | Hastbacka |
| 4,322,978 | A | 4/1982 | Fromm |
| 4,378,701 | A | 4/1983 | Mountain et al. |
| 4,395,258 | A | 7/1983 | Wang et al. |
| 4,402,609 | A | 9/1983 | Fetzer et al. |
| 4,425,794 | A | 1/1984 | Duesbury |
| 4,428,239 | A | 1/1984 | Johnston |
| 4,450,722 | A | 5/1984 | Keyes, IV et al. |
| 4,452,202 | A | 6/1984 | Meyer |
| 4,479,761 | A | 10/1984 | Bilstad et al. |
| 4,493,695 | A | 1/1985 | Cook |
| 4,493,706 | A | 1/1985 | Borsanyi et al. |
| 4,505,157 | A | 3/1985 | Hong Le |
| 4,530,647 | A | 7/1985 | Uno |
| 4,537,561 | A | 8/1985 | Xanthopoulos |
| 4,539,849 | A | 9/1985 | Pike |
| 4,541,283 | A | 9/1985 | Stuhlmann |
| 4,594,533 | A | 6/1986 | Snook et al. |
| 4,625,559 | A | 12/1986 | Carter et al. |
| 4,627,833 | A | 12/1986 | Cook |
| 4,653,508 | A | 3/1987 | Cosman |
| 4,665,391 | A | 5/1987 | Spani |
| 4,667,097 | A | 5/1987 | Fasching et al. |
| 4,680,445 | A | 7/1987 | Ogawa |
| 4,680,475 | A | 7/1987 | Tansony et al. |
| 4,703,314 | A | 10/1987 | Spani |
| 4,713,051 | A | 12/1987 | Steppe et al. |
| 4,755,669 | A | 7/1988 | Grant et al. |
| 4,758,238 | A | 7/1988 | Sundblom et al. |
| 4,768,547 | A | 9/1988 | Danby et al. |
| 4,773,897 | A | 9/1988 | Scheller et al. |
| 4,775,991 | A | 10/1988 | Staudinger et al. |
| 4,790,816 | A | 12/1988 | Sundblom et al. |
| 4,795,440 | A | 1/1989 | Young et al. |
| 4,798,090 | A | 1/1989 | Heath et al. |
| 4,798,580 | A | 1/1989 | DeMeo et al. |
| 4,838,865 | A | 6/1989 | Flank et al. |
| 4,861,242 | A | 8/1989 | Finsterwald |
| 4,886,070 | A | 12/1989 | Demarest |
| 4,892,985 | A | 1/1990 | Tateishi |
| 4,920,336 | A | 4/1990 | Meijer |
| 4,921,477 | A | 5/1990 | Davis |
| 4,923,375 | A | 5/1990 | Ejlersen |
| 4,927,411 | A | 5/1990 | Pastrone et al. |
| 4,933,545 | A | 6/1990 | Saaski et al. |
| 4,935,005 | A | 6/1990 | Haines |
| 4,963,131 | A | 10/1990 | Wortrich |
| 5,008,530 | A | 4/1991 | Ball |
| 5,029,478 | A | 7/1991 | Wamstad |
| 5,041,096 | A | 8/1991 | Beuchat et al. |
| 5,056,992 | A | 10/1991 | Simons et al. |
| 5,080,098 | A | 1/1992 | Willett et al. |
| 5,080,457 | A | 1/1992 | Fetzer et al. |
| 5,095,401 | A | 3/1992 | Zavracky et al. |
| 5,106,366 | A | 4/1992 | Steppe |
| 5,131,739 | A | 7/1992 | Katsuragi |
| 5,144,843 | A | 9/1992 | Tamura et al. |
| 5,163,900 | A | 11/1992 | Wortrich |
| 5,195,960 | A | 3/1993 | Hossain et al. |
| 5,207,647 | A | 5/1993 | Phelps |
| 5,257,630 | A | 11/1993 | Broitman et al. |
| 5,267,956 | A | 12/1993 | Beuchat |
| 5,275,053 | A | 1/1994 | Wlodarczyk et al. |
| 5,302,093 | A | 4/1994 | Owens et al. |
| 5,319,978 | A | 6/1994 | Grudzien, Jr. et al. |
| 5,333,504 | A | 8/1994 | Lutz et al. |
| 5,339,289 | A | 8/1994 | Erickson |
| 5,351,547 | A | 10/1994 | Grudzien et al. |
| 5,353,633 | A | 10/1994 | Benedikt et al. |
| 5,364,342 | A | 11/1994 | Beuchat et al. |
| 5,385,053 | A * | 1/1995 | Wlodarczyk et al. ........... 73/705 |
| 5,392,653 | A | 2/1995 | Zanger et al. |
| 5,403,277 | A | 4/1995 | Dodge et al. |
| 5,424,756 | A | 6/1995 | Ho et al. |
| 5,429,485 | A | 7/1995 | Dodge |
| 5,429,602 | A | 7/1995 | Hauser |
| 5,460,049 | A | 10/1995 | Kirsch |
| 5,460,490 | A | 10/1995 | Carr et al. |
| 5,470,312 | A | 11/1995 | Zanger et al. |
| 5,499,969 | A | 3/1996 | Beuchat et al. |
| 5,518,378 | A | 5/1996 | Neftel et al. |
| 5,528,214 | A | 6/1996 | Koga et al. |
| 5,534,708 | A | 7/1996 | Ellinger et al. |
| 5,583,297 | A | 12/1996 | Stocker et al. |
| 5,586,438 | A | 12/1996 | Fahy |
| 5,588,815 | A | 12/1996 | Zaleski, II |
| 5,634,907 | A | 6/1997 | Rani et al. |
| 5,661,245 | A | 8/1997 | Svoboda et al. |
| 5,709,539 | A | 1/1998 | Hammer et al. |
| 5,746,708 | A | 5/1998 | Giesler et al. |
| 5,746,719 | A | 5/1998 | Farra et al. |
| 5,747,824 | A | 5/1998 | Jung et al. |
| 5,752,918 | A | 5/1998 | Fowler et al. |
| 5,759,017 | A | 6/1998 | Patton et al. |
| 5,810,204 | A | 9/1998 | Devlin et al. |
| 5,810,766 | A | 9/1998 | Barnitz et al. |
| 5,848,971 | A | 12/1998 | Fowler et al. |
| 5,866,822 | A | 2/1999 | Willig |
| 5,877,417 | A | 3/1999 | Arvidson et al. |
| 5,880,373 | A | 3/1999 | Barton |
| 5,880,480 | A | 3/1999 | Ellinger et al. |
| 5,897,524 | A | 4/1999 | Wortrich et al. |
| 5,906,598 | A | 5/1999 | Giesler et al. |
| 5,910,110 | A | 6/1999 | Bastable |
| 5,927,956 | A | 7/1999 | Lim et al. |
| 5,995,235 | A * | 11/1999 | Sui et al. .................. 356/419 |
| 5,996,634 | A | 12/1999 | Dennehey et al. |
| 6,005,242 | A | 12/1999 | Chernyak |
| 6,012,999 | A | 1/2000 | Patterson |
| 6,024,428 | A | 2/2000 | Uchikata |
| 6,036,458 | A | 3/2000 | Cole |
| 6,058,779 | A | 5/2000 | Cole |
| 6,059,544 | A | 5/2000 | Jung |
| 6,059,765 | A | 5/2000 | Cole et al. |
| 6,075,646 | A | 6/2000 | Suzuki |
| 6,084,519 | A | 7/2000 | Coulling et al. |
| 6,110,110 | A | 8/2000 | Dublin et al. |
| 6,116,736 | A | 9/2000 | Stark et al. |
| 6,124,926 | A * | 9/2000 | Ogawa et al. ............. 356/237.4 |
| 6,129,699 | A | 10/2000 | Haight et al. |
| 6,206,850 | B1 | 3/2001 | O'Neil |
| 6,226,081 | B1 | 5/2001 | Fantone et al. |
| 6,235,009 | B1 | 5/2001 | Skow |
| 6,261,283 | B1 | 7/2001 | Morgan et al. |
| 6,267,956 | B1 | 7/2001 | Gomes |
| 6,272,930 | B1 | 8/2001 | Crozafon et al. |
| 6,293,926 | B1 | 9/2001 | Sorensen et al. |
| 6,364,342 | B1 | 4/2002 | Kim |
| 6,364,857 | B1 | 4/2002 | Gray et al. |
| 6,428,171 | B1 | 8/2002 | Aoki et al. |
| 6,494,694 | B2 | 12/2002 | Lawless et al. |
| 6,533,729 | B1 | 3/2003 | Khair et al. |
| 6,561,999 | B1 | 5/2003 | Nazarifar |
| 6,572,349 | B2 | 6/2003 | Sorensen et al. |
| 6,592,737 | B1 | 7/2003 | Robertson |
| 6,811,386 | B2 | 11/2004 | Hedington et al. |
| 6,827,709 | B2 | 12/2004 | Fujii |
| 6,908,451 | B2 | 6/2005 | Brody et al. |
| 6,941,813 | B2 | 9/2005 | Boukhny et al. |

(56) References Cited

U.S. PATENT DOCUMENTS

| | | | |
|---|---|---|---|
| 6,953,262 B2 * | 10/2005 | Cleaver et al. | 362/219 |
| 6,955,073 B2 | 10/2005 | Morgan et al. | |
| 6,962,488 B2 | 11/2005 | Davis et al. | |
| 6,974,948 B1 | 12/2005 | Brent | |
| 6,975,400 B2 * | 12/2005 | Ortyn et al. | 356/419 |
| 7,326,183 B2 | 2/2008 | Nazarifar et al. | |
| 7,393,189 B2 | 7/2008 | Davis et al. | |
| 7,468,796 B2 * | 12/2008 | Luther et al. | 356/411 |
| 7,589,340 B2 | 9/2009 | Dancs et al. | |
| 7,773,231 B2 * | 8/2010 | Kinugasa | 356/478 |
| 2001/0016711 A1 | 8/2001 | Sorensen | |
| 2001/0035887 A1 | 11/2001 | Altfather et al. | |
| 2002/0021490 A1 | 2/2002 | Kasahara et al. | |
| 2002/0140933 A1 * | 10/2002 | Oshida et al. | 356/317 |
| 2003/0190244 A1 | 10/2003 | Davis et al. | |
| 2003/0202894 A1 | 10/2003 | Leukanech | |
| 2003/0204172 A1 | 10/2003 | Steppe | |
| 2003/0225363 A1 | 12/2003 | Gordon | |
| 2004/0074281 A1 | 4/2004 | Lobdell et al. | |
| 2004/0089067 A1 | 5/2004 | Frank | |
| 2004/0106915 A1 | 6/2004 | Thoe | |
| 2004/0253129 A1 | 12/2004 | Sorensen | |
| 2004/0261534 A1 | 12/2004 | Boukhny et al. | |
| 2005/0065462 A1 | 3/2005 | Nazarifar | |
| 2005/0186098 A1 | 8/2005 | Davis | |
| 2005/0234395 A1 | 10/2005 | Mackool | |
| 2005/0285025 A1 | 12/2005 | Boukhny et al. | |
| 2007/0098578 A1 | 5/2007 | Morgan | |
| 2008/0000485 A1 | 1/2008 | Williams et al. | |
| 2008/0066542 A1 | 3/2008 | Gao | |
| 2008/0077077 A1 | 3/2008 | Williams et al. | |
| 2008/0103433 A1 | 5/2008 | Nazarifar et al. | |
| 2008/0200878 A1 | 8/2008 | Davis et al. | |
| 2008/0271741 A1 | 11/2008 | Graham et al. | |

FOREIGN PATENT DOCUMENTS

| | | |
|---|---|---|
| DE | 43 41 232 A1 | 6/1995 |
| DE | 10123155 | 11/2002 |
| EP | 0 157 606 | 3/1985 |
| EP | 0208955 | 1/1987 |
| EP | 0544945 | 6/1993 |
| EP | 0777111 A1 | 6/1997 |
| EP | 1213033 | 6/2002 |
| EP | 0777111 B1 | 9/2003 |
| EP | 1779878 | 5/2007 |
| EP | 1873510 A1 | 1/2008 |
| FR | 2 466 641 A1 | 4/1981 |
| GB | 1254860 | 11/1971 |
| JP | 56112609 | 9/1981 |
| JP | 60 149937 A | 8/1985 |
| JP | 62 091818 | 4/1987 |
| JP | 07 505542 | 1/1993 |
| JP | 06 010899 | 1/1994 |
| JP | 07 120292 | 5/1995 |
| JP | 09 178535 | 10/1996 |
| JP | 09 185047 | 7/1997 |
| JP | 2000 510239 | 8/2000 |
| JP | 2001 165054 | 6/2001 |
| RU | 2000023 C1 | 2/1993 |
| WO | WO 87/01943 | 4/1987 |
| WO | WO 88/04042 | 6/1988 |
| WO | WO 93/15777 A2 | 8/1993 |
| WO | WO 93/24082 A1 | 12/1993 |
| WO | WO 93/24817 | 12/1993 |
| WO | WO 99/20983 | 4/1999 |
| WO | WO 99/23463 | 5/1999 |
| WO | WO 2004/045395 A2 | 6/2004 |

OTHER PUBLICATIONS

ESR for EP 06122960.5, Publicaiton No. EP1779879, 2 pages—Dec. 19, 2006.*

Excerpts from pp. 3-3, 3-13, & 3-14 of the Series Ten Thousand Ocutome STTOdx Cavitron/Kelman Phaco-Emulsifier Aspirator Service Manual; Alcon Laboratories, Inc. Nov. 1995 (5 pages).

Schematic, PCB, M/A Pneumatic Control; Dwg. No. 940-8040-025; Alcon Surgical, Jul. 1990 (1 page).

Schematic, PCB, Photocell, Cassette; Dwg. No. 940-8040-002; CooperVision, Aug. 1987 (1 page).

Schematic, PCB, LED, Cassette; Dwg. No. 940-8040-001; CooperVision, Sep. 1987 (1 page).

ESR for EP 06122959.7, Publication No. EP1779878, 2 pages.

ESR for EP 06122960.5, Publication No. EP 1779879, 2 pages.

Weber, Peter, "Optischer Sensor mibt fullstande in Glassrohen," Feinwerktechnik & Messtechnik, Jan. 1999, pp. 31-33, vol. 99, No. 1/2, Hanser, Munchen, DE.

ESR for Application No. 07123297.9, Publication No. 1935383, Published Jun. 25, 2008, 3 pages.

International Searching Authority, International Search Report, PCT/US2011/048923, Date of ISR Feb. 29, 2012, 4 pages.

International Searching Authority, Written Opinion of the International Searching Authority, PCT/US2011/048923, Date of WO Feb. 29, 2012, 7 pages.

Reynolds, Gordon S., Todd Robert J., Russell Edward J., "Disposable Transducer Apparatus for an Electromanometry System," U.S. Reissued Patent RE 33,360, Date of Patent: Oct. 2, 1990, 11 pages.

Weber, Peter, "Optical Sensor Measures Filling Levels in Glass Tubes," Feinwerktechnik & Messtechnik, 99, No. 1/2 (Jan. 1991), pp. 31-33 (14 pages).

McCord Kenneth R., Bullock James K., Gilroy Keith, Gille, Hearick K, Arkans Edward J, and Anderson, Paul, "Pressure Transducer Assembly," U.S. Reissued Patent RE 33,518, Date of Patent: Jan. 15, 1991, 12 pages.

* cited by examiner

OPTICAL SENSING SYSTEM INCLUDING ELECTRONICALLY SWITCHED OPTICAL MAGNIFICATION

This application claims priority under 35 U.S.C. §119 to U.S. Provisional Patent Application Ser. No. 61/378,081, filed on Aug. 30, 2010.

BACKGROUND

Optical imaging systems may employ multiple selectable magnifications. Selecting between available magnifications typically involves mechanical manipulation of optical elements to achieve a selected magnification. The switching may be accomplished manually or by means of a mechanized drive system. Mechanical switching mechanisms may involve complex designs that can be expensive to produce. Mechanical switching mechanisms may also be less reliable due to moving parts that may be prone to wear and breakage.

DETAILED DESCRIPTION

Figure 1:
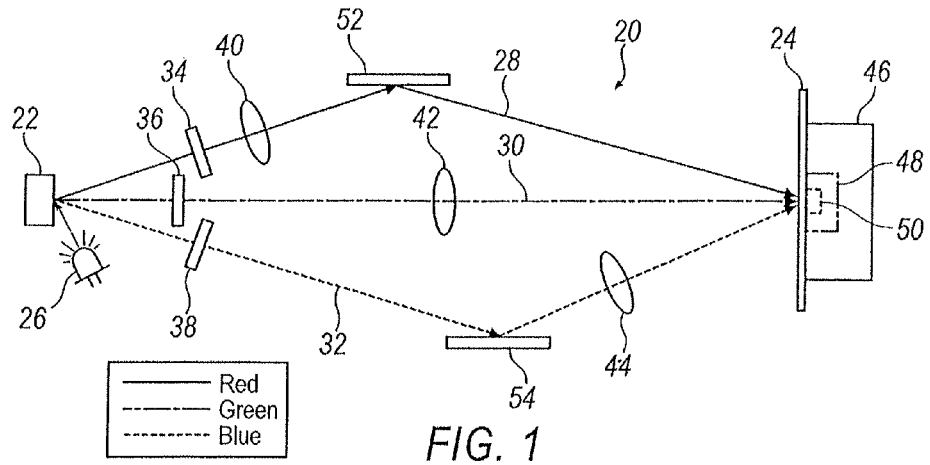
FIG. 1 is a schematic illustration of an exemplary optical sensing system employing multiple electronically switched optical magnifications.

Referring now to the discussion that follows and the corresponding drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive, otherwise limit, or restrict the claims to the precise forms and configurations shown in the drawings and disclosed in the following detailed description.

FIG. 1 illustrates an exemplary optical sensing system 20 that may be used to electronically image an object 22. Optical sensing system 20 may include multiple electronically selectable optical magnifications for controlling an image size of object 22, as projected onto an image sensor 24. The term "optical magnification", as used herein, includes both a process of enlarging an image size and a process of decreasing an image size. Optical magnification may be quantified as a dimensionless number representing a ratio between an image size of object 22, as projected onto image sensor 24, and the actual size of object 22. Optical magnifications greater than one indicate that the projected image size is greater than the actual size of object 22, and an optical magnification less than one indicates that the projected image size is less than the actual size of object 22.

Switching between multiple optical magnifications may be accomplished electronically, so as to not require physical movement of optical elements to implement a selected optical magnification. An optical magnification may be selected by adjusting a wavelength range of light used to illuminate object 22. The optical elements associated with each selectable optical magnification are generally distributed along separate optical paths. Each optical path may include an optical filter configured to allow light within a particular wavelength range to pass along the selected optical path, while blocking light at other wavelengths. An optical magnification may be selected by adjusting the wavelength of light used to illuminate object 22 so as to fall within the wavelength range corresponding to the selected optical magnification.

Continuing to refer to FIG. 1, optical sensing system 20 may include one or more light sources 26 for illuminating object 22. Light source 26 may employ various light emitters, such as light emitting diodes (LEDs) and lasers. For illustrative convenience, light source 26 is illustrated in the drawing figures as a single light emitter, but in practice, light source 26 may include one or more light emitters, depending, at least in part, on the design and performance requirements of a particular application. Light source 26 may be configured to selectively produce light within multiple discrete wavelength ranges. Light source 26 generally emits light within only one discrete wavelength range at any given time. The multiple discrete wavelength ranges emitted from light source 26 generally do not substantially overlap one another.

In the exemplary configuration of optical sensing system 20, light source 26 is configured to emit light across three discrete wavelength ranges. When employing LEDs as light source 26, the three discrete wavelength ranges may be generated by varying the composition of a semiconductor material used to manufacture the LEDs, and/or by varying an operating voltage applied to the semiconductor material. For example, a semiconductor material made of Aluminum Gallium Arsenide (AlGaAs) generally produces a red light within a wavelength ($\lambda$) of approximately $610<\lambda<760$ nanometers (nm); a semiconductor material made of Aluminum Gallium Phosphide (AlGaP) generally produces a green light with a wavelength range of approximately $500<\lambda<570$ nanometers (nm); and a semiconductor material made of Indium Gallium Nitride (InGaN) generally produces a blue light within a wavelength range of approximately $450<\lambda<500$ nanometers (nm). These are merely some examples of the various types of semiconductor materials that may be employed to produce light within a selected wavelength range. Other semiconductor formulations may also be employed to produce light within a desired wavelength range.

Continuing to refer to FIG. 1, at least a portion of the light emitted from light source 26 is reflected from object 22 and travels along an optical path corresponding to a selected optical magnification. Each optical path extends from light source 26 to image sensor 24. The exemplary configuration of optical sensing system 20 includes three selectable optical magnifications, although a different number of optical magnifications may also be employed, depending on the design and performance requirements of a particular application. A first optical path 28 provides a first optical magnification; a second optical path 30 provides a second optical magnification; and a third optical path 32 provides a third optical magnification. Each optical path generally coincides with a route light emitted from light source 26 takes through the respective optical magnifications as it travels to image sensor 24.

Each optical path 28, 30 and 32, may include an optical filter for controlling the wavelength range of light passing through the respective optical path to image sensor 24. For example, first optical path 28 may include a first optical filter 34; second optical path 30 may include a second optical filter 36; and third optical path 32 may include a third optical filter 38. The optical filters may have any of a variety of configurations, and may include a dichroic filter, a thin-film filter, or an interference filter. Optical filters 34, 36 and 38 may also include dichroic mirrors and reflectors. Optical filters 34, 36 and 38 are configured to selectively pass light over a relatively narrow wavelength range, while blocking other wavelength ranges. Each optical filter may be configured to pass light within a separate discrete wavelength range that does not substantially overlap the wavelength range of the remaining filters. For example, first optical filter 34 may be configured to pass light emitted from light source 26 in the red wavelength range, while substantially blocking other wavelengths. Light in the red wavelength range is represented schematically in the drawing figures as a solid line. Similarly, second optical filter 36 may be configured to pass light emitted from light source 26 in the green wavelength range, while blocking other wavelengths. Light in the green wavelength range is represented schematically in the drawing figures as a broken line consisting of a series of large and small dashes. Third optical filter 38 may be configured to pass light emitted from light source 26 in the blue wavelength range, while blocking other wavelengths. Light in the blue wavelength range is represented schematically in the drawing figures as a dashed line. Thus, optical filter 34 may be configured to pass at least a portion of the red wavelengths emitted from light source 26, while blocking substantially all of the green and blue wavelengths. Similarly, optical filter 36 may be configured to pass at least a portion of the green wavelengths emitted from light source 26, while blocking substantially all of the red and blue wavelengths. Optical filter 38 may be configured to pass at least a portion of the blue wavelengths emitted from light source 26, while blocking substantially all of the red and green wavelengths.

It is not necessary that a given optical filter pass all wavelengths within a particular discrete wavelength range emitted from light source 26, provided the filter blocks substantially all other wavelengths falling outside the emitted wavelength range. For example, first optical filter 34 may be configured to pass only a portion of the red wavelengths emitted from light source 26, but blocks substantially all of the green and blue wavelengths. Likewise, optical filter 36 may be configured to pass only a portion of the green wavelengths emitted from light source 26, but blocks substantially all of the red and blue wavelengths. Similarly, optical filter 38 may be configured to pass only a portion of the blue wavelengths emitted from light source 26, but blocks substantially all of the red and green wavelengths.

Continuing to refer to FIG. 1, optical sensing system 20 may include one or more optical magnifying elements configured to produce a particular optical magnification. For example, a first optical magnifying element 40 may be disposed along first optical path 28; a second optical magnifying element 42 may be disposed along second optical path 30; and a third optical magnifying element 44 may be disposed along third optical path 32. Each of the optical magnifying elements may be configured to produce a different optical magnification. For purposes of discussion, first optical magnifying element 40 associated with first optical path 28 produces the largest optical magnification, followed by second optical magnifying element 42 associated with second optical path 30, followed lastly by third optical magnifying element 44 associated with third optical path 32. Although the exemplary configuration of optical sensing system 20 employs a single optical magnifying element with each of the three optical paths, in practice, any number or arrangement of optical magnifying elements may be employed to achieve a desired magnification.

Light passing through optical paths 28, 30 and 32 may be focused on image sensor 24. Image sensor 24 may have any of a variety of configurations, including, but not limited to, a charge-coupled-device (CCD), a complementary-metal-oxide semiconductor (CMOS), and a photo- sensitive diode (PD), each of which is capable of capturing an image projected onto image sensor 24.

The size of an image projected onto image sensor 24 will vary depending on the optical magnification selected. For example, selecting the optical magnification corresponding to optical path 28 will produce the largest image size of the three available optical magnifications. Selecting the optical magnification corresponding to optical path 32 produces the smallest image size, while selecting the optical magnification corresponding to optical path 30 produces an intermediate image size. For comparative purposes, an exemplary image size of object 22, as projected onto image sensor 24, for each of the available optical magnifications is illustrated schematically in the drawing figures. A first projected image 46 represents an exemplary image size that may be produced when using the optical magnification corresponding to optical path 28. A second projected image 48 represents an exemplary image size that may be produced when using the optical magnification corresponding to optical path 30. A third projected image 50 represents an exemplary image size that may be produced when using the optical magnification corresponding to optical path 32. To clarify which optical path produces which projected image, the same line format used to designate the respective optical path is also used to designate the corresponding projected image. Thus, projected image 46, produced using the optical magnification corresponding to optical path 28, is represented by a solid line; projected image 48, produced using the optical magnification corresponding to optical path 30, is represented by a broken line consisting of short and long dashes; and projected image 50, produced using the optical magnification corresponding to optical path 32, is represented by a dashed line.

With continued reference to FIG. 1, optical sensing system 20 may also include various optical reflecting elements for configuring the optical paths to accommodate the design requirements of a particular application. For example, first optical path 28 may include a first optical reflecting element 52 for directing light passing through first optical filter 34 and first optical magnifying element 40 onto image sensor 24.

Similarly, third optical path 32 may include a second optical reflecting element 54 for directing light passing through third optical filter 38 and third optical magnifying element 44 onto image sensor 24. Other optical reflective elements may also be employed to produce an optical path having a desired configuration.

Figure 2:
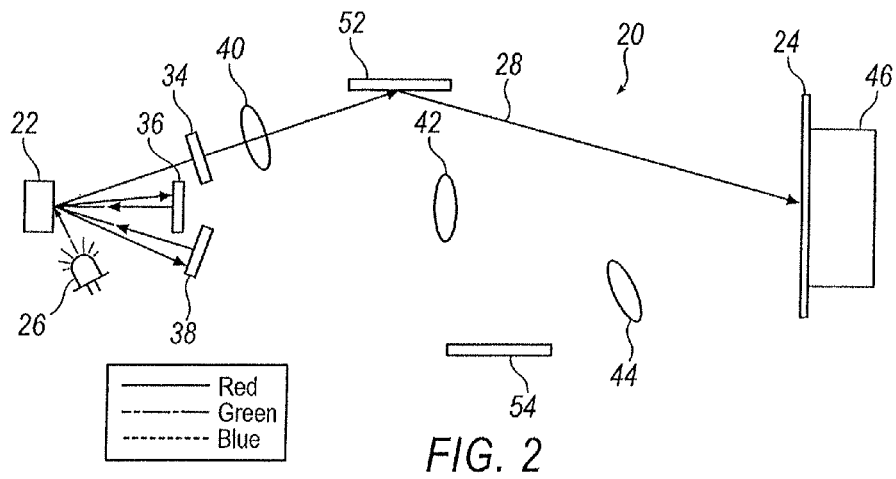
FIG. 2 is a schematic illustration of the exemplary optical sensing system of FIG. 1, shown selectively arranged in a first optical magnification.
Figure 3:
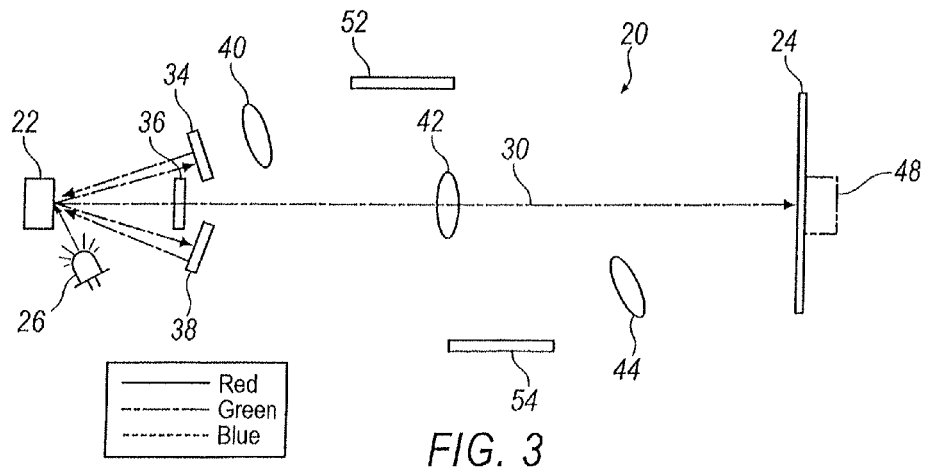
FIG. 3 is a schematic illustration of the exemplary optical sensing system of FIG. 1, shown selectively arranged in a second optical magnification.

Referring to FIGS. 2 and 3, an optical magnification may be selected by selectively adjusting a wavelength range of light emitted from light source 26 to fall within the range of wavelengths that will pass through the optical filter associated with the selected optical magnification. As discussed previously, optical filters 34, 36 and 38 may be configured to pass light within separate discrete wavelength ranges. For example, in the exemplary configuration of optical sensing system 20, first optical filter 34 is configured to pass light emitted from light source 26 in the red wavelength range; optical filter 36 is configured to pass light in the green wavelength range; and optical filter 38 is configured to pass light in the blue wavelength range. The optical filters 34, 36 and 38 are also configured to block those wavelengths falling outside of the range of wavelengths that will pass through the respective optical filter. With particular reference to FIG. 2, the optical magnification associated with optical path 28 may selected by adjusting light source 26 to emit light in the red wavelength range that will pass through first optical filter 34, but be blocked by optical filters 36 and 38. Selecting the optical magnification associated with optical path 28 projects an image of object 22 onto image sensor 24 corresponding to first projected image 46. With particular reference to FIG. 3, the optical magnification associated with second optical path 30 may selected by adjusting light source 26 to emit light in the green wavelength range that will pass through second optical filter 36, but be blocked by optical filters 34 and 38. Selecting the optical magnification associated with second optical path 30 projects an image of object 22 onto image sensor 24 corresponding to second projected image 48. The optical magnification associated with third optical path 32 may be similarly selected by adjusting light source 26 to emit light in the blue wavelength range that will pass through third optical filter 38, but be blocked by optical filters 34 and 36. Selecting the optical magnification associated with optical path 32 projects an image of object 22 onto image sensor 24 corresponding to third projected image 50, as shown in FIG. 1.

Figure 4:
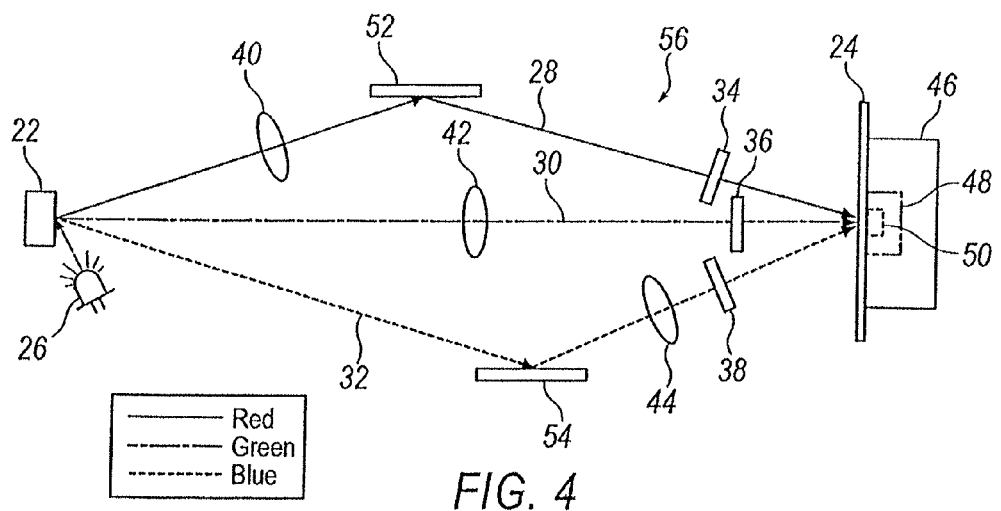
FIG. 4 is a schematic illustration of an alternately configured exemplary optical sensing system.

The exemplary configuration of optical sensing system 20 illustrates one possible arrangement of the various optical elements. Other arrangements may also be employed. An example of an alternative arrangement is shown in FIG. 4. An alternatively configured optical sensing system 56 may generally include the same optical components as optical sensing system 20 (FIG. 1), but with optical filters 34, 36 and 38 arranged between their respective optical magnifying elements 40, 42 and 44, and image sensor 24. Other arrangements may include positioning at least one optical filter upstream of its respective optical magnifying element (as shown in FIG. 1), and at least one optical filter downstream of its corresponding optical magnifying element (as shown in FIG. 4).

Figure 5:
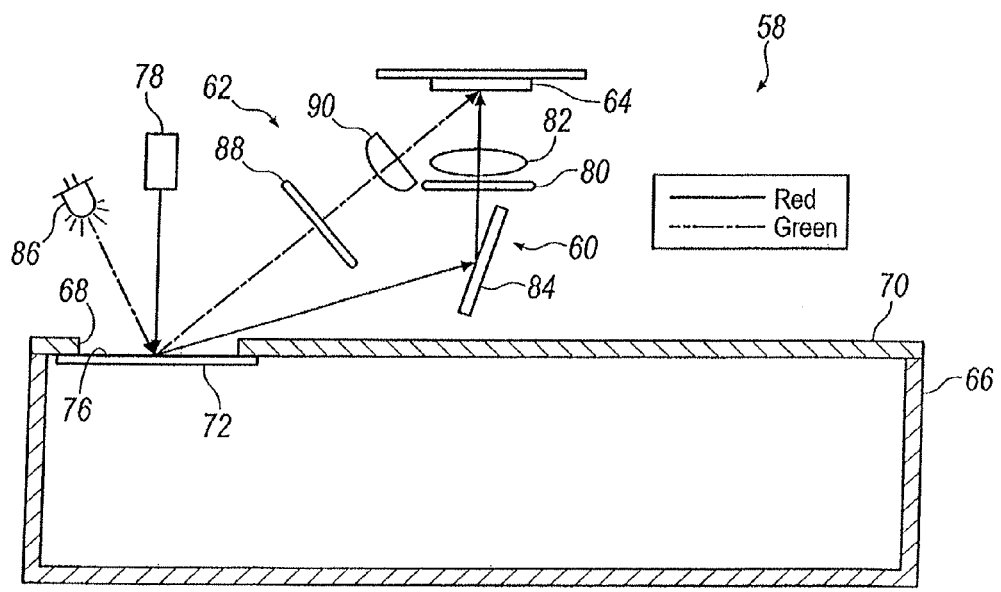
FIG. 5 is a schematic illustration of an exemplary optical sensing system employing an optical pressure sensor and an optical reader.

Referring to FIG. 5, a second exemplary optical sensing system 58 may include a non-contact optical pressure sensor 60, and an optical reader 62. Optical pressure sensor 60 and optical reader 62 may employ different optical magnifications. Similar to optical sensing system 20 (as shown in FIG. 1), optical sensing system 58 may utilize optical filters in conjunction with light emitted within selected discrete wavelengths ranges to enable electronic switching between available optical magnifications. A single image sensor 64 may be employed with both optical pressure sensor 60 and optical reader 62. Image sensor 64 may have any of a variety of configurations, including, but not limited to, a charge-coupled-device (CCD), a complementary-metal-oxide semiconductor (CMOS), and a photosensitive diode (PD), each of which is capable of capturing an image projected onto the image sensor by optical pressure sensor 60 and optical reader 62.

Figure 6:
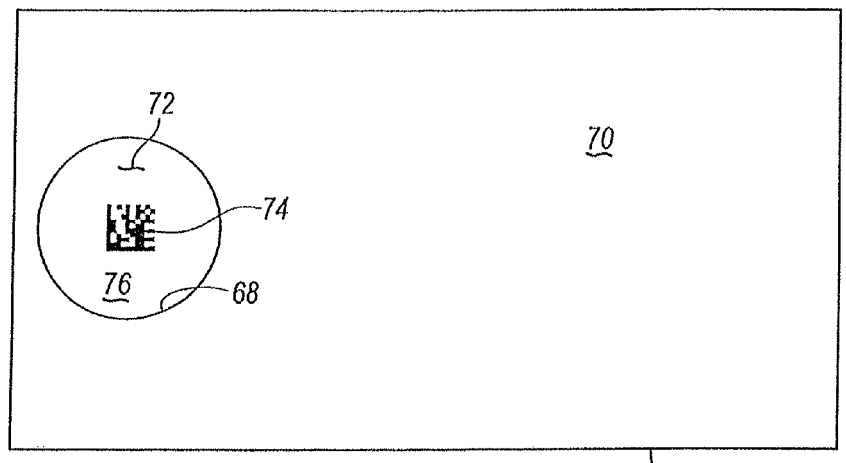
FIG. 6 is a top elevational view of an exemplary pressure chamber that may be employed with the optical sensing system of FIG. 5.

Continuing to refer to FIG. 5, optical pressure sensor 60 may provide a noninvasive mechanism for measuring pressure in various systems that require pressure monitoring. More particularly, optical pressure sensor 60 may be employed with various surgical machines and systems, such as ophthalmic surgical systems, in which it may be beneficial to monitor a pressure of system fluids. For example, optical pressure sensor 60 may be used to monitor a pressure within a pressure chamber 66. Pressure chamber 66 may be made of a variety of materials, such as metal, glass, plastic, and composites, and may be of any size or shape. Pressure chamber 66 may contain a fluid having a pressure. One or more ports may be provided in pressure chamber 66 through which the pressure within chamber 66 may be varied. A pressure-monitoring aperture 68 may be provided in a wall 70 of pressure chamber 66. A flexible diaphragm 72 may be affixed across aperture 68. Diaphragm 72 is a flexible member that may be made of any compliant material having reasonable dimensional stability over a variety of operating conditions, such as stainless steel. Diaphragm 72 may be configured as a substantially flat diaphragm, a pre-curved diaphragm (concave or convex), or a corrugated diaphragm. Referring also to FIG. 6, diaphragm 72 may include various imagable markings, such as a barcode 74, imprinted on a visually accessible surface 76 of the diaphragm. The imprinted markings may be imaged using optical reader 62.

Optical pressure sensor 60 may include a first light source 78 configured to emit a light beam over a relative narrow wavelength range. In the exemplary configuration of optical sensing system 58, first light source 78 is configured to emit light generally within a red wavelength range. However, in practice, a different wavelength range may be selected. First light source 78 may include any of a variety of available light sources, such as a laser, laser diode, or laser excited fluorescence (LEF) device. First light source 78 may include a single light emitting element or an array of multiple light emitting elements.

Optical pressure sensor 60 may further include a first optical filter 80 configured to allow light within a particular wavelength range to pass through the optical filter, while blocking other wavelengths. In the exemplary configuration of optical sensing system 58, first optical filter 80 may be configured to pass at least a portion of the wavelengths emitted from first light source 78, while substantially blocking other wavelengths outside of the emitted range. It is not necessary that first optical filter 80 pass all of the wavelengths emitted from first light source 78, so long as the optical filter passes at least some of the wavelengths. First optical filter 80 may have any of a variety of configurations, such as a dichroic filter, a thin-film filter, or an interference filter, each configured to selectively pass light over a relatively narrow wavelength range while reflecting other wavelength ranges. First optical filter 80 may also be configured as a dichroic mirror or reflector.

Optical pressure sensor 60 may also include one or more first optical magnifying elements 82 configured to produce a particular optical magnification and to focus light emitted from first light source 78 onto imaging sensor 64. Although the exemplary configuration is shown to employ a single optical magnifying element 82, in practice, any number or arrangement of optical magnifying elements may be employed to achieve a desired optical magnification.

With continued reference to FIG. 5, optical pressure sensor 60 may also include various optical reflective elements for configuring an optical path extending from first light source 78 to imaging sensor 64 to accommodate the design and performance requirements of a particular application. For example, an optical reflecting element 84 may be provided for directing light emitted from first light source 78 through first optical filter 80 and first optical magnifying element 82. Other optical reflective elements may also be employed to produce an optical path having a desired configuration.

Figure 7:
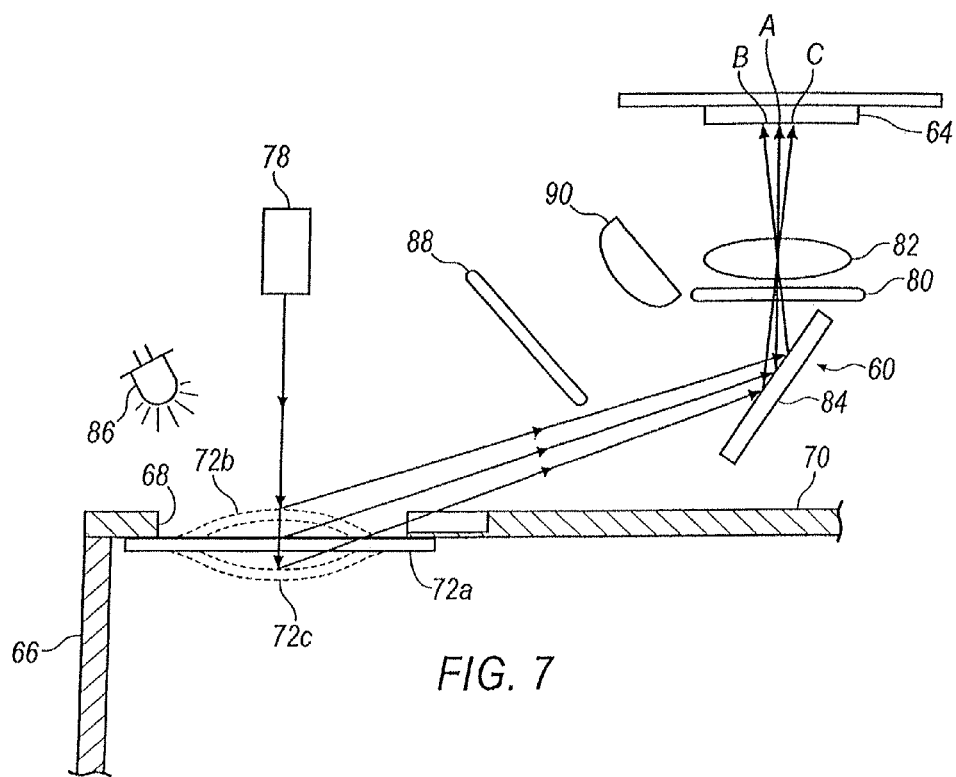
FIG. 7 schematically illustrates operation of the optical pressure sensor employed with the optical sensing system of FIG. 5.

FIG. 7 provides a schematic depiction of an exemplary operating scheme for optical pressure sensor 60. Optical pressure sensor 60 may detect a change in the pressure level within pressure chamber 66 by detecting a corresponding change in a location of a light beam projected onto image sensor 64. First light source 78 projects a beam of light onto diaphragm 72. The light beam illuminates a relatively small localized region of diaphragm 72. The illuminated region may be projected onto image sensor 64. The location of the illuminated region as projected onto imaging sensor 64 may change in response to a displacement of diaphragm 72. A change in pressure within pressure chamber 66 causes a corresponding deflection of diaphragm 72. Increasing the pressure within pressure chamber 66 causes the diaphragm to deflect outward, whereas, decreasing the pressure causes the diaphragm to deflect inward. The change in position of diaphragm 72 causes a corresponding change in the location of the illuminated region on diaphragm 72 as projected on image sensor 64. With diaphragm 72 arranged in a generally neutral position 72a, the light beam emitted from light source 78 projects onto imaging sensor at location A. Increasing the pressure within pressure chamber 66 causes diaphragm 72 to deflect outward, which in turn causes the location of the projected light beam on imaging sensor 64 to move toward the right, when viewed from the perspective of FIG. 7, to location B. Decreasing the pressure within pressure chamber 66 causes diaphragm 72 to deflect inward, which in turn causes the location of the projected light beam on image sensor 64 to move toward the left, when viewed from the perspective of FIG. 7, to location C. The location and or change in position of the projected light beam on image sensor 64 may be correlated to a corresponding pressure within pressure chamber 66.

Referring again to FIG. 5, optical reader 62 may include a second light source 86 configured to emit a light beam over a relative narrow wavelength range. In the exemplary configuration of optical sensing system 58, light source 86 may be configured to emit light within a generally green wavelength range. In practice, a different wavelength range may be selected, provided the selected wavelength range does not substantially overlap the wavelength range emitted from first light source 78. Second light source 86 may include any of a variety of available light sources, such as a light emitting diode (LED), a laser, laser diode, or laser excited fluorescence (LEF) device. Second light source 86 may include a single light emitting element or an array of multiple light emitting elements. For purposes of discussion, light source 86 is depicted as an LED.

Optical reader 62 may include a second optical filter 88 configured to allow light within a particular wavelength range to pass through the optical filter, while blocking other wavelengths. In the exemplary configuration of optical sensing system 58, second optical filter 88 may be configured to pass at least a portion of the wavelengths emitted from second light source 86, while substantially blocking other wavelengths outside of the range emitted from second light source 86. It is not necessary that second optical filter 86 pass all of the wavelengths emitted from second light source 86, so long as the optical filter passes at least some of the wavelengths. Second optical filter 88 may have any of a variety of configurations, such as a dichroic filter, a thin-film filter, or an interference filter, each configured to selectively pass light over a relatively narrow wavelength range while reflecting other wavelength ranges. Second optical filter 88 may also include a dichroic mirror or reflector.

Optical reader 62 may also include one or more second optical magnifying elements 90 configured to produce a particular optical magnification and for focusing light emitted from second light source 86 onto image sensor 64. Although the exemplary configuration of optical reader 62 is shown to employ a single optical magnifying element 90, any number or arrangement of optical magnifying elements may be employed to achieve a desired optical magnification. The exemplary configuration of optical reader 62 does not employ optical reflective elements, but such optical elements may be utilized to configure the optical path extending from second light source 86 to image sensor 64 to accommodate the design requirements of a particular application.

Optical reader 62 may be operated by illuminating marking 74 imprinted on diaphragm 72 with light emitted from second light source 86. Light reflected from diaphragm 72 may pass through second optical filter 88 and second optical magnifying element 90, to be projected onto image sensor 64. The projected imaged maybe detected by image sensor 64.

Figure 8:
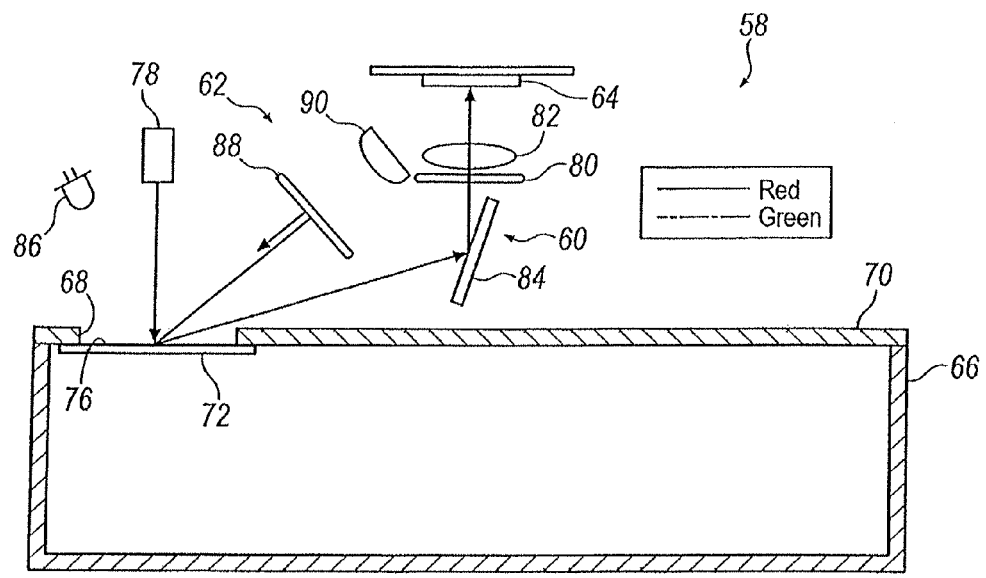
FIG. 8 is a schematic illustration of the exemplary optical sensing system of FIG. 5, with the optical pressure sensor activated and the optical reader deactivated.
Figure 9:
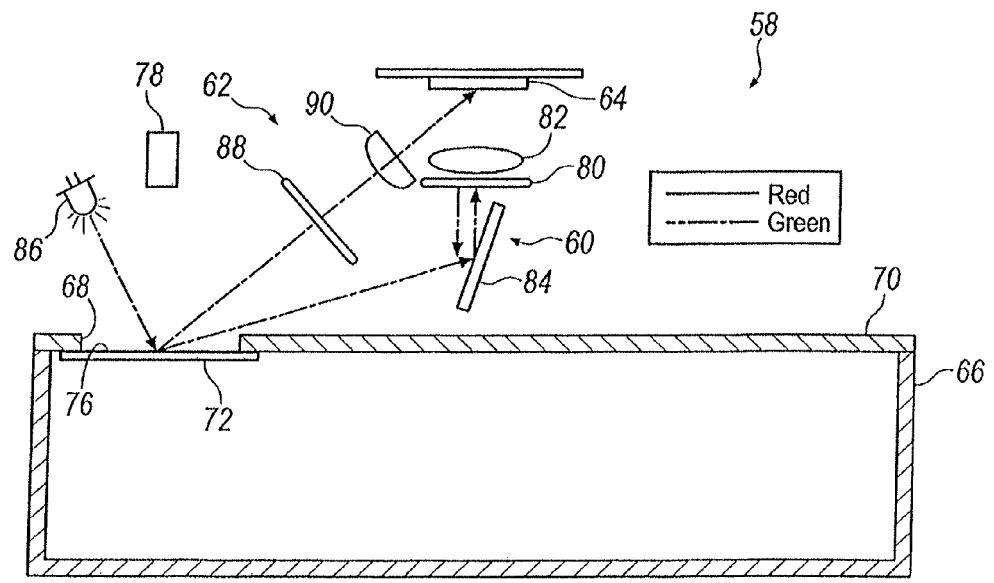
FIG. 9 is a schematic illustration of the exemplary optical sensing system of FIG. 5, with the optical reader activated and the optical pressure sensor deactivated.

Referring to FIGS. 8 and 9, optical pressure sensor 60 and optical reader 62 may be selectively activated by turning on their respective light sources 78 and 86. Generally, only one light source will be activated at any given instance. With particular reference to FIG. 8, activating optical pressure sensor 60 (with optical reader 62 deactivated) causes light source 78 to emit light in a relatively narrow red wavelength range that will pass through first optical filter 80 associated with optical pressure sensor 60, but will be blocked by second optical filter 88 associated with optical reader 62. Similarly, activating optical reader 62 (with optical pressure sensor 60 deactivated) causes light source 86 to emit light in a relatively narrow green wavelength range that will pass through second optical filter 88 associated with optical reader 62, but will be blocked by first optical filter 80 associated with optical pressure sensor 60.

Figure 10:
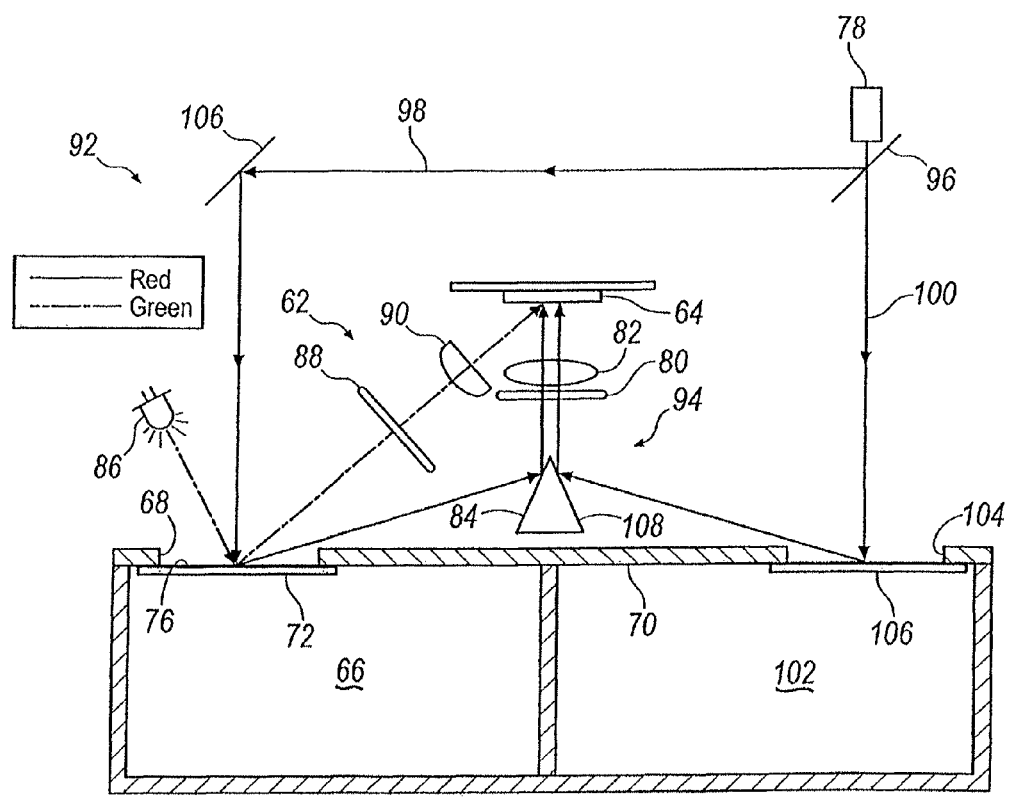
FIG. 10 is a schematic illustration of an optical sensing system employing an optical reader and a dual optical pressure sensor.

With Reference to FIG. 10, an alternately configured optical sensing system 92 may include optical reader 62 and a dual optical pressure sensor 94. Optical reader 62 may operate and be similarly configured as previously described. Dual optical pressure sensor 94 may be used to monitor a first pressure within pressure chamber 66, and a second pressure within a second pressure chamber 102. Second pressure chamber 102 may be similarly constructed as pressure chamber 66. Second pressure chamber 102 may contain a fluid having a pressure. One or more ports may be provided in second pressure chamber 102 through which the pressure within chamber 102 may be varied. A second pressure-monitoring aperture 104 may be provided in common wall 70 of pressure chamber 66 and second pressure chamber 102. A second flexible diaphragm 106 may be affixed across aperture 104. Diaphragm 106 may be similarly configured as diaphragm 72, and may be made from any compliant material having reasonable dimensional stability over a variety of operating conditions, such as stainless steel. Second diaphragm 106 may be configured as a substantially flat diaphragm, a pre-curved diaphragm (concave or convex), or a corrugated diaphragm.

Dual optical pressure sensor 94 may be similarly configured as optical pressure sensor 60, but instead employs two separate light beams for measuring the two separate pressures in pressure chambers 66 and 102. Light source 78 may be used to generate the light beams. As previously described, light source 78 may be configured to emit light generally within the red wavelength range. A beam splitter 96 divides the light beam emitted from light source 78 into a first light beam 98 and a second light beam 100. First light beam 98 is used to detect a pressure within pressure chamber 66, and second light beam 100 is used to detect a pressure within second pressure chamber 102. A second optical reflecting element 106 projects first light beam 98 onto diaphragm 76, the location of which may be detected by image sensor 64 in substantially the same manner as previously described with respect to optical pressure sensor 60. Second light beam 100 may be projected onto second diaphragm 106. A third optical reflecting element 108 may be employed for projecting an image onto sensor 64 of a region on second diaphragm 106 illuminated by second light beam 100. The projected image may pass through first optical filter 80 and first optical magnifying element 82. The pressure within second pressure chamber 102 may be determined in the same manner as previously described with respect to optical pressure sensor 60.

Figure 11:
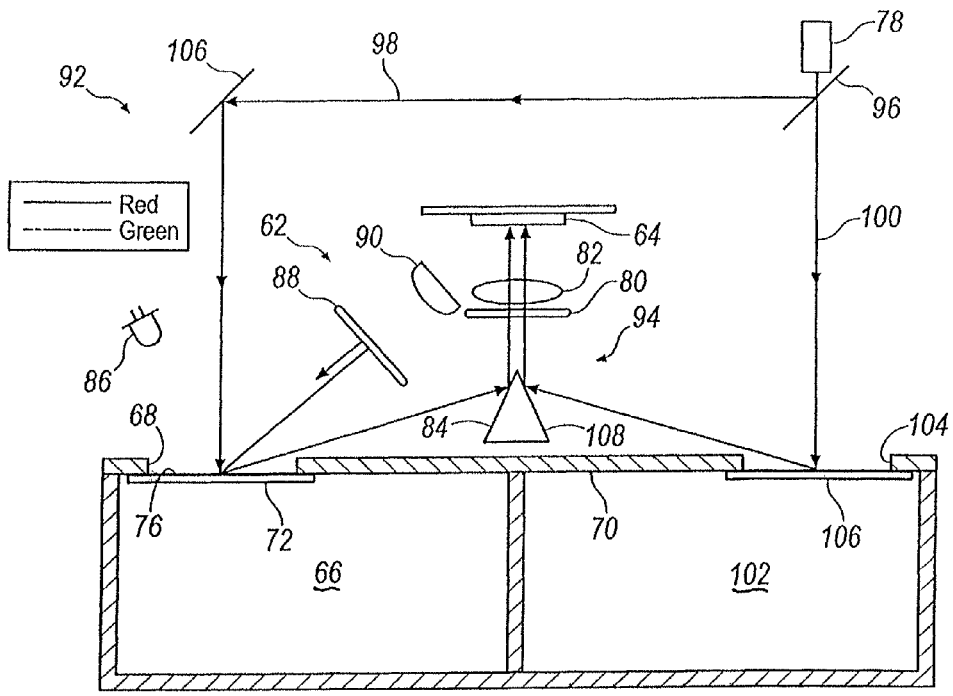
FIG. 11 is a schematic illustration of the exemplary optical sensing system of FIG. 10, with the dual optical pressure sensor activated and the optical reader deactivated.
Figure 12:
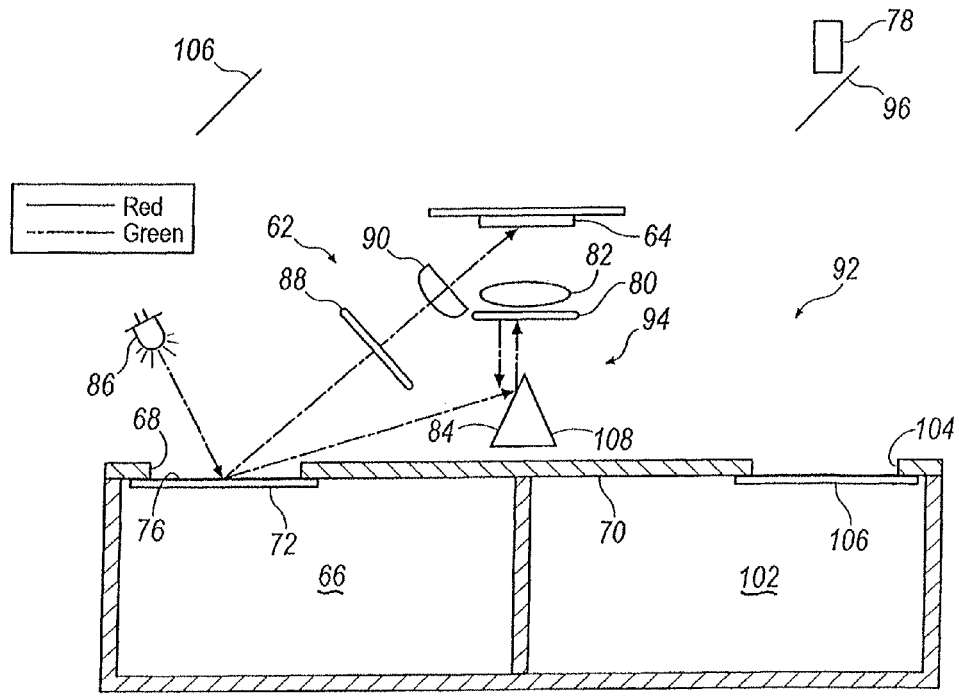
FIG. 12 is a schematic illustration of the exemplary optical sensing system of FIG. 10, with the optical reader activated and the dual optical pressure sensor deactivated.

Referring to FIGS. 11 and 12, dual optical pressure sensor 94 and optical reader 62 may be selectively activated by turning on their respective light sources 78 and 86. Generally, only one light source will be activated at any given instance. With particular reference to FIG. 11, activating dual optical pressure sensor 94 (with optical reader 62 deactivated) causes light source 78 to emit light in a relatively narrow red wavelength range that will pass through first optical filter 80 associated with dual optical pressure sensor 94, but will be blocked by second optical filter 88 associated with optical reader 62. Similarly, activating optical reader 62 (with dual optical pressure sensor 94 deactivated) causes light source 86 to emit light in a relatively narrow green wavelength range that will pass through second optical filter 88 associated with optical reader 62, but will be blocked by first optical filter 80 associated with dual optical pressure sensor 94.

It will be appreciated that the exemplary optical sensing system described herein has broad applications. The foregoing configurations were chosen and described in order to illustrate principles of the methods and apparatuses as well as some practical applications. The preceding description enables others skilled in the art to utilize methods and apparatuses in various configurations and with various modifications as are suited to the particular use contemplated. In accordance with the provisions of the patent statutes, the principles and modes of operation of the disclosed LED illuminator have been explained and illustrated in exemplary configurations.

It is intended that the scope of the present methods and apparatuses be defined by the following claims. However, it must be understood that the disclosed optical sensing system may be practiced otherwise than is specifically explained and illustrated without departing from its spirit or scope. It should be understood by those skilled in the art that various alternatives to the configuration described herein may be employed in practicing the claims without departing from the spirit and scope as defined in the following claims. The scope of the disclosed optical sensing system should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. Furthermore, all terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary. It is intended that the following claims define the scope of the device and that the method and apparatus within the scope of these claims and their equivalents be covered thereby. In sum, it should be understood that the device is capable of modification and variation and is limited only by the following claims.

What is claimed is:

1. An optical sensing system comprising:
a first light source configured to emit light in a first wavelength range;
a second light source configured to emit light in a second wavelength range;
a single image sensor configured for detecting light emitted from the first and second light sources;
a pressure chamber with a flexible diaphragm, the flexible diaphragm having a visually accessible surface;
a first optical filter disposed in a first optical path extending between the first light source and the image sensor, the first optical filter configured to pass at least a portion of the light emitted from the first light source in the first wavelength range, and to substantially block the light emitted from the second light source in the second wavelength range, the first optical path including the visually accessible surface;
a second optical filter disposed in a second optical path extending between the second light source and the image sensor, the second optical filter configured to pass at least a portion of the light emitted from the second light source in the second wavelength range, and to substantially block the light emitted from the first light source in the first wavelength range, the second optical path including the visually accessible surface;
a first optical magnifying element disposed in the first optical path;
a second optical magnifying element disposed in the second optical path;
wherein an optical magnification of the first optical magnifying element is different than an optical magnification of the second optical magnifying element.

2. The optical sensing system of claim 1, wherein the first optical magnifying element is disposed in the first optical path between the first optical filter and the image sensor.

3. The optical sensing system claim 1, wherein the first optical magnifying element is disposed in the first optical path between the first light source and the first optical filter.

4. The optical sensing system of claim 1, wherein the first optical magnifying element is disposed in the first optical path between the first optical filter and the image sensor, and the second optical magnifying element is disposed in the second optical path between the second optical filter, and the image sensor.

5. The optical sensing system of claim 1, wherein the first light source comprises a light emitting diode and the second light source comprises a laser.

6. The optical sensing system of claim 1, wherein the first wavelength range and the second wavelength range do not substantially overlap.

7. The optical sensing system of claim 1, further comprising at least one optical reflecting element disposed in at least one of the first and second optical paths.

8. An optical sensing system comprising:
- a first light source configured to emit light in a first wavelength range;
- a second light source configured to emit light in a second wavelength range;
- a single image sensor configured for detecting light emitted from the first and second light sources;
- a first pressure chamber with a first flexible diaphragm, the first flexible diaphragm having a first visually accessible surface;
- a second pressure chamber with a second flexible diaphragm, the second flexible diaphragm having a second visually accessible surface;
- a first optical filter disposed in a first optical path and a second optical path, the first optical path and second optical path extending between the first light source and the image sensor, the first optical filter configured to pass at least a portion of the light emitted from the first light source in the first wavelength range, and to substantially block the light emitted from the second light source in the second wavelength range, the first optical path including the first visually accessible surface, and the second optical path including the second visually accessible surface;
- a second optical filter disposed in a third optical path extending between the second light source and the image sensor, the second optical filter configured to pass at least a portion of the light emitted from the second light source in the second wavelength range, and to substantially block the light emitted from the first light source in the first wavelength range, the third optical path including the first visually accessible surface;
- a first optical magnifying optical element disposed in the first optical path;
- a second optical magnifying element disposed in the second optical path;
- wherein an optical magnification of the first optical magnifying element is different than an optical magnification of the second optical magnifying element.

9. The system of claim 8 further comprising:
- a plurality of reflecting elements disposed in the first and second optical paths.

10. An optical pressure sensing system comprising:
- a pressure chamber at least partially bounded by a flexible diaphragm;
- a first light source that emits light in a first wavelength range;
- a second light source that emits light in a second wavelength range;
- a first optical filter that passes light in the first wavelength range and blocks light in the second wavelength range;
- a second optical filter that passes light in the second wavelength range and blocks light in the first wavelength range;
- a first optical magnifying element;
- a second optical magnifying element; and
- an image sensor that detects light emitted from the first and second light sources;
- wherein light emitted from the first light source reflects off of the flexible membrane, passes through the first optical filter and the first magnifying element and reaches the image sensor; and light emitted from the second light source reflects off of the flexible membrane, passes through the second optical filter and the second magnifying element and reaches the image sensor.

11. The system of claim 10 wherein the first magnifying element has a different optical magnification than the second optical magnifying element.

12. The system of claim 10 further comprising:
- an optical reflecting element that reflects light from the first light source.

* * * * *